United States Patent
Missiaggia

(10) Patent No.: US 11,041,875 B2
(45) Date of Patent: Jun. 22, 2021

(54) WHEEL HUB ASSEMBLY WITH DEVICE FOR AMPLIFYING A MAGNETIC SIGNAL

(71) Applicant: Aktiebolaget SKF, Gothenburg (SE)

(72) Inventor: Giorgio Missiaggia, Triste (IT)

(73) Assignee: Aktiebolaget SKF

( * ) Notice: Subject to any disclaimer, the term of this patent is extended or adjusted under 35 U.S.C. 154(b) by 14 days.

(21) Appl. No.: 16/693,782

(22) Filed: Nov. 25, 2019

(65) Prior Publication Data
US 2020/0166083 A1 May 28, 2020

(30) Foreign Application Priority Data
Nov. 22, 2018 (IT) .................. 102018000010494

(51) Int. Cl.
*F16C 41/00* (2006.01)
*G01P 3/44* (2006.01)
*B60B 27/00* (2006.01)

(52) U.S. Cl.
CPC .......... *G01P 3/443* (2013.01); *B60B 27/0068* (2013.01); *F16C 41/007* (2013.01); *F16C 2326/02* (2013.01)

(58) Field of Classification Search
CPC .. F16C 19/186; F16C 41/007; F16C 2326/02; B60B 27/0068; G01P 3/443
See application file for complete search history.

(56) References Cited

U.S. PATENT DOCUMENTS

| | | | | |
|---|---|---|---|---|
| 5,385,411 A | * | 1/1995 | Shirai | ................ F16C 33/78 324/174 |
| 5,850,141 A | * | 12/1998 | Adler | ................ G01P 3/443 324/174 |
| 6,538,426 B1 | | 3/2003 | Enrietto et al. | |
| 8,052,329 B2 | * | 11/2011 | Ono | .............. G01D 5/24423 384/448 |

FOREIGN PATENT DOCUMENTS

| | | |
|---|---|---|
| DE | 112008001276 T5 | 6/2010 |
| DE | 102015223877 A1 | 6/2017 |
| JP | 2006010478 A | 1/2006 |

* cited by examiner

Primary Examiner — Phillip A Johnson
(74) Attorney, Agent, or Firm — Reed Smith LLP

(57) ABSTRACT

A wheel hub assembly for motor vehicles, provided with a hub and a bearing unit as well as a device for detecting a vehicle parameter, having an encoder and a magnetic sensor, there being arranged between the encoder and the speed sensor an amplification device for amplifying the magnetic signal, which is stationary and has a radially outer ferromagnetic ring facing the encoder and provided with a first lug and a radially inner ferromagnetic ring facing the encoder and provided with a second lug, said first lug and second lug being arranged facing the magnetic sensor on opposite sides, the amplification device being configured to collect the magnetic flux generated by the plurality of pole pairs of the encoder via the ferromagnetic rings and concentrate it towards the magnetic sensor by means of the first lug and the second lug.

21 Claims, 4 Drawing Sheets

WHEEL HUB ASSEMBLY WITH DEVICE FOR AMPLIFYING A MAGNETIC SIGNAL

CLAIM OF PRIORITY

This application claims the benefit of priority to Italian Application No. 102018000010494 of the same title filed on Nov. 22, 2018, under 35 U.S.C. § 119, the entire contents of which are incorporated herein by reference.

FIELD

The present invention relates to a wheel hub assembly provided with a device for providing a magnetic signal.

BACKGROUND

Devices for detecting the speed of rotation of the rotating ring of the bearing include a phonic wheel or encoder and a sensor, e.g., a speed sensor, which is able to acquire a signal generated by the phonic wheel. Such a device may be controlled, for example, by a brake control system (ABS) and also allows monitoring of kinematic operating parameters of a wheel hub assembly with rolling bearing.

BRIEF DESCRIPTION OF THE DRAWINGS

The invention will now be described with reference to the attached drawings which illustrate a number of non-limiting examples of preferred embodiments thereof, in which.

DETAILED DESCRIPTION

Figure 1:
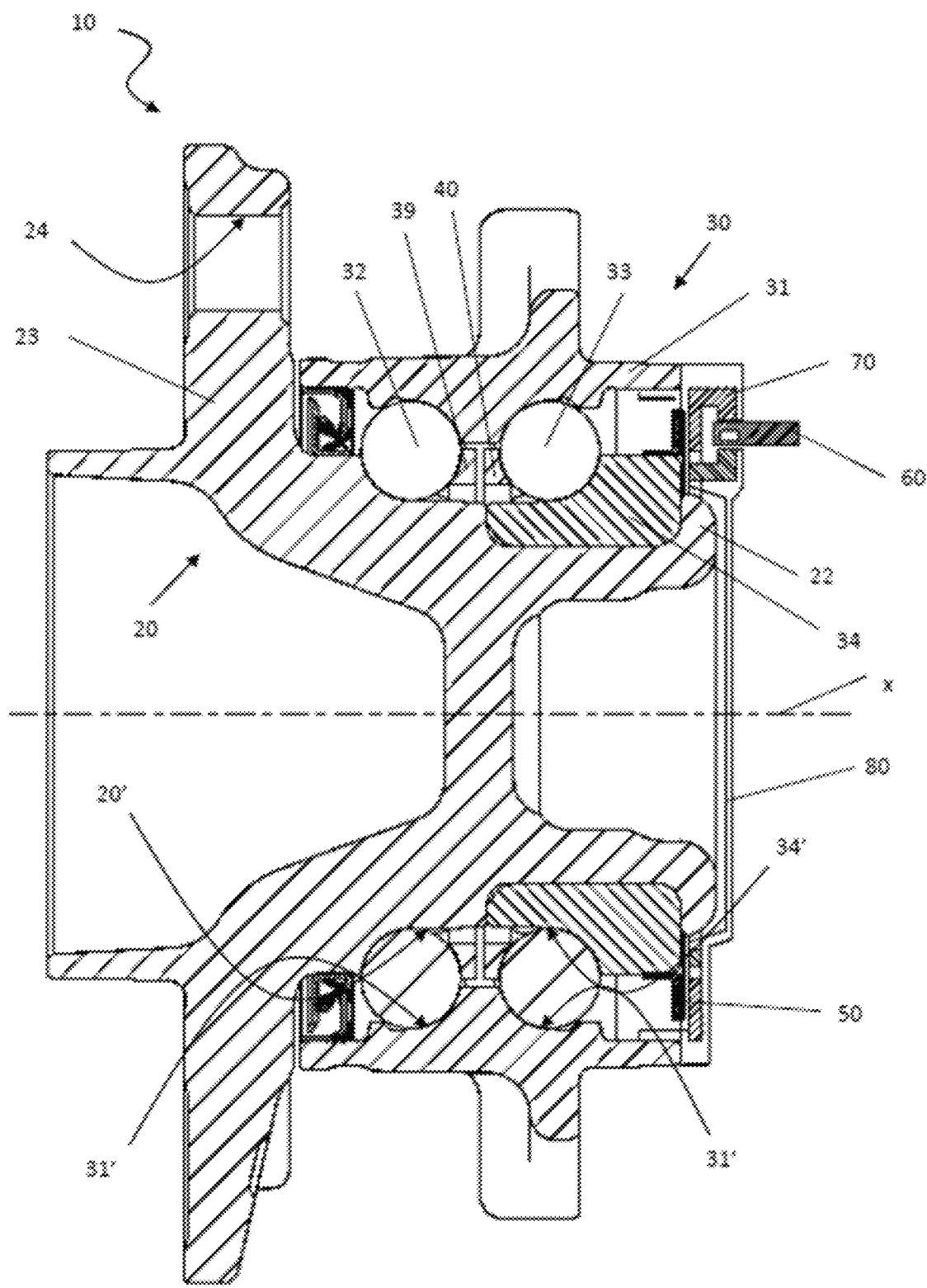
FIG. 1 is a cross-section of a wheel hub assembly provided with a device for amplifying the magnetic signal in accordance with this disclosure.

Purely by way of a non-limiting example, the present invention will now be described with reference to a wheel hub assembly for motor vehicles, provided with a rolling bearing.

The present invention is suitable in particular, although not exclusively, for the wheel hub assemblies of motor vehicles, said assemblies being provided with a rolling bearing. These applications comprise both the case where the outer ring of a bearing is rotating, while the inner ring of a bearing is fixed, and an opposite case where an inner ring rotates and an outer ring is fixed. The invention is also suitable for any type of rolling body (balls, rollers, tapered rollers, etc.).

Devices for detecting the speed of rotation of the rotating ring of the bearing comprise a phonic wheel or encoder and a sensor, normally a speed sensor, which is able to acquire a signal generated by the phonic wheel. Such a device may, e.g., be controlled by a brake control system (ABS) and also allows monitoring of kinematic operating parameters of a wheel hub assembly with rolling bearing.

A phonic wheel or encoder may take the form of an annular disc or cylindrical screen made of plastic or magnetized rubber. It may be angularly fixed to a rotating element, e.g., to an axially inner end of a rotating ring of a bearing. An encoder may comprise a metal insert, which is fixed to a plastic or magnetized rubber portion, for example by means of gluing, and fixed by means of a force fit to a rotating ring of a bearing or to an element integral therewith, for example a slide-type sealing element.

A phonic wheel are may comprise plasto-ferrite or magnetized rubber, which may be respectively co-vulcanized or co-moulded onto a metal insert with a thickness of 0.6-0.8 mm having a structural function. An outer surface of an encoder has an alternating arrangement of pairs of north/south poles which, during rotation in operating conditions, generate a variable magnetic field. A field variation determines angular resolution of movement and, therefore, speed of rotation.

Measurement of speed of rotation of wheels or bearing associated with a wheel is fundamental for operation of ABS. Speed sensors may be based on magnetic effects: for example they consist of Hall effect or variable-reluctance sensors. Speed sensors may be positioned outside of bearings—e.g., inside a hole formed in the suspension—and face a bearing. Magnetic sensors are preferable in some applications, because of their low cost and their strength.

Distance between an encoder and a corresponding sensor may be critical for ensuring reading of a signal even in the worst conditions. This could, but for the techniques disclosed herein, constitute a limitation in the design of the wheel hub assembly. Purchasers of wheel hub assemblies may require that a wheel hub assembly be provided with a sensor housed on a suspension upright, with a consequent need for greater distances between sensor and encoder.

A density of reverse-polarity pairs which may be housed on encoders. Density of pole pairs therefore would also constitute a limitation on the reading resolution of the sensor. For example, for an encoder with an average diameter of 70 mm, a number of pole pairs may not exceed 48. A greater number of pole pairs would diminish an amount of ferrite which can be deposited on each pole and therefore would not be effective for signal resolution. This limitation becomes even greater in view of use and diffusion of devices for autonomous driving of vehicles, for example parking assistance devices, are creating the need for a greater resolution in order to ensure better control of the vehicle position.

To overcome these drawbacks, a reading capacity of the sensor may be increased, with a consequent increase in the costs of the component. It is desirable, alternatively, to design a wheel hub assembly provided with an encoder and sensor based on existing technology while ensuring a better resolution and signal reading distance at lower costs.

A magnetic signal may be read by a magnetic sensor that may be a device for detecting speed of rotation, namely a sensor which measures speed of rotation of a wheel of a motor vehicle and is controlled by the known Antilock Brake System (ABS).

Embodiments in accordance with this disclosure, although not exclusively, for wheel hub assemblies of motor vehicles provided with a rolling bearing. These applications comprise both a first case where the outer ring of a bearing is rotating, while an inner ring of a bearing is fixed, and a second case where an inner ring rotates and an outer ring is fixed. Various embodiments are also suitable for any type of rolling body (balls, rollers, tapered rollers, etc.).

Figure 2:
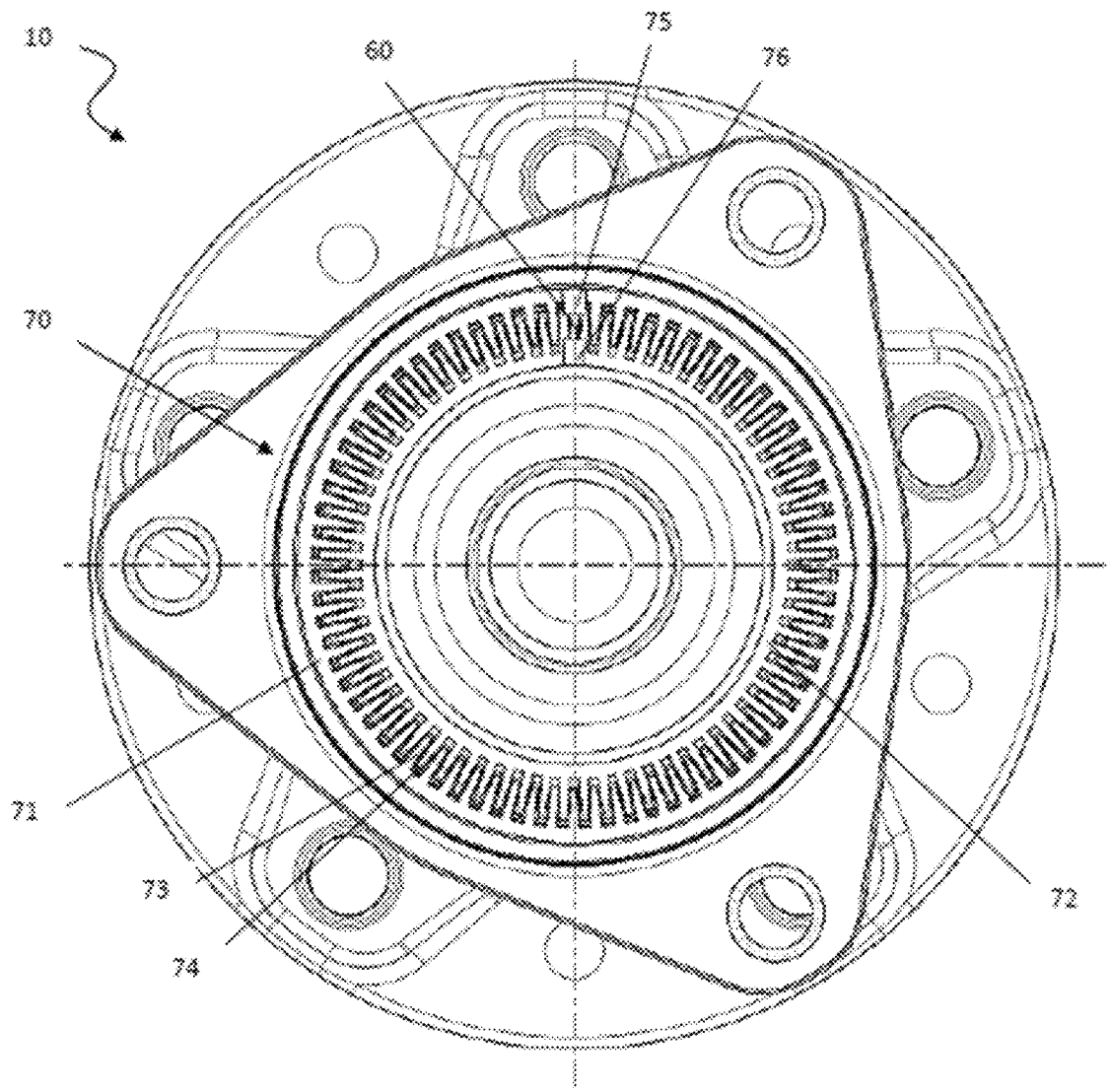
FIG. 2 is a side view of a wheel hub assembly in accordance with the present disclosure.

With reference to FIGS. 1 and 2, a wheel hub assembly 10 according to an exemplary preferred embodiment is shown. Assembly 10 has a central rotation axis X and comprises a hub 20 which is preferably, but not necessarily, rotating and a bearing unit 30 in turn comprising: a radially outer ring 31, which is preferably—but not necessarily—stationary; a radially inner ring 20 defined by the hub 20; a further radially inner ring 34 rotatably mounted on and integral with the hub 20; two rows of rolling bodies 32, 33, in this example balls, arranged between the radially outer ring 31 and the radially inner rings 20 and 34; and two cages 39 and 40 for keeping in position rolling bodies of two rows of rolling bodies 32, 33.

In the whole of the present description and in the claims, the terms and expressions indicating positions and orientations such as "radial" and "axial" are understood as referring to the central axis of rotation X of the bearing unit 30. Expressions such as "axially outer" and "axially inner" refer instead to the assembled condition of the wheel hub assembly, e.g., to a wheel side and, respectively, to a side opposite to the wheel side.

Radially outer ring 31 is provided with two respective radially outer raceways 31', while radially inner rings 20, 34 are provided with respective radially inner raceways 20', 34' for allowing rolling of rows of axially outer rolling bodies 32 arranged between radially outer ring 31 and the hub 20 and a row of axially inner rolling bodies 33 between a radially outer ring 31 and a radially inner ring 34. For the sake of simpler illustration reference numbers 32, 33 indicate both single balls and rows of balls. Again for the sake of simplicity, the term "ball" may be used by way of example in the present description and in the attached drawings instead of the more generic term "rolling body" (and likewise the same reference numbers will also be used).

Hub 20 defines at its axially inner end a rolled edge 22 which is configured to preload axially inner ring 34. The hub 20 also has an axially outer flange portion 23. Flange portion 23 has a plurality of axial fixing holes 24. These holes are seats for corresponding fixing means (for example stud bolts, not shown in the figures) which connect in a known manner a part of the motor vehicle wheel, for example a brake disc (also known per se and not shown in the figures), to the hub 20.

A wheel hub assembly is also provided with a means for detecting a parameter of the motor vehicle, for example a speed of rotation of a rotating ring of the bearing unit 30, and is provided with an encoder 50 and with a sensor, for example a magnetic-effect speed sensor 60. An encoder is made using may, e.g., be an encoder with an average diameter of 70 mm with a number of pole pairs equal to 48. A number of pole pairs could also be different, for example, 43 or 44. An encoder may, e.g., be firmly fixed to a rotating component of a wheel hub assembly, such as, according to exemplary embodiments shown in FIG. 1, to radially inner ring 34 of bearing unit 30. Speed sensor 60 is a magnetic sensor, which may be a Hall effect or variable-reluctance sensor.

Arranged between encoder 50 and speed sensor 60 there is an amplification device 70 for amplifying a magnetic signal. An amplification device 70, operation of which will be explained below, faces encoder 50 and is a stationary component. It comprises a radially outer ferromagnetic ring 71 and a radially inner ferromagnetic ring 72 which face an encoder and are at a same axial distance from the encoder itself. The two ferromagnetic rings are stationary and may be stably fixed to a stationary component of a wheel hub assembly. In the exemplary embodiments shown in FIGS. 1 and 2, ferromagnetic rings 71, 72 may be co-moulded inside a polymeric matrix 80 inserted into radially outer ring 31 of a bearing unit 30.

Figure 3:
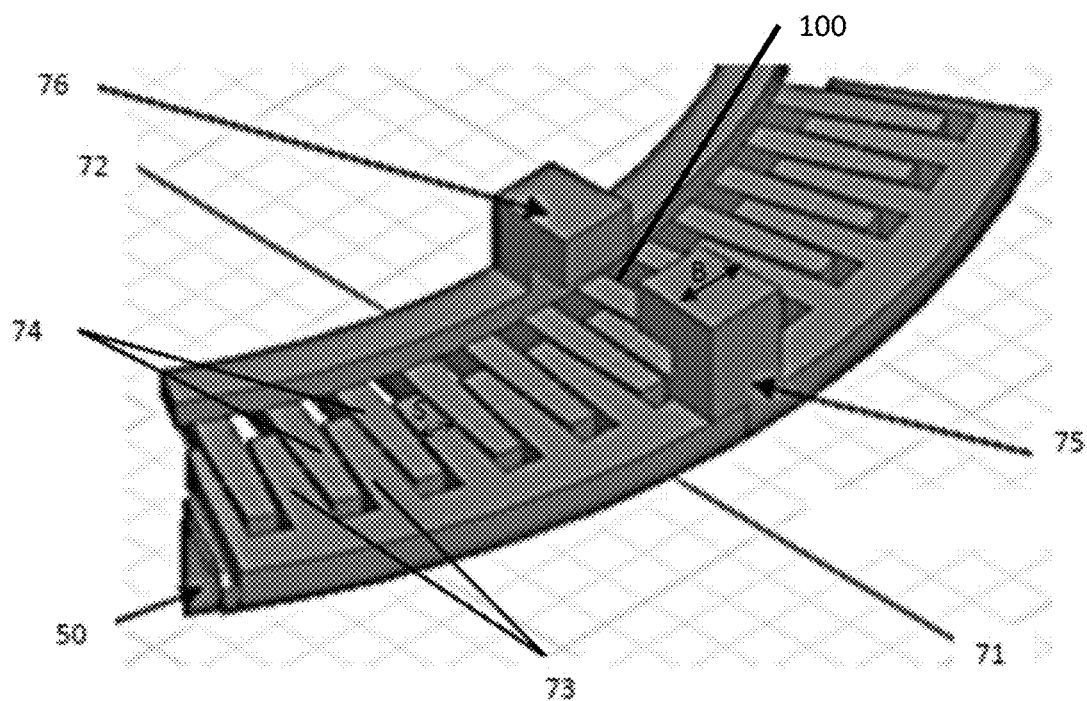
FIG. 3 is an exemplary schematic representation of an amplification device in accordance with this disclosure.

A characteristic feature of ferromagnetic rings 71, 72 is that radially outer ferromagnetic ring 71 comprises a first plurality of teeth 73 and radially inner ferromagnetic ring 72 comprises a second plurality of teeth 74, respectively. These two pluralities of teeth 73, 74 (as can be seen more clearly in FIG. 3) are made so there is an alternation in the tangential direction (i.e., a tangential alternation) between a tooth 73 and a tooth 74. Each tooth of the two pluralities of teeth 73, 74 faces a pole of the encoder and has same dimensions as a single pole of the encoder. For example, each tooth 73 will face a north pole of encoder 50, while each tooth 74 will face a south pole of encoder 50.

In this way, ferromagnetic rings 71, 72 increase the magnetic field by collecting the magnetic flux generated by the pole pairs of encoder 50.

Moreover, each ferromagnetic ring 71, 72 is provided with a corresponding lug 75, 76, each of which is arranged facing a sensor, e.g., 60 on opposite sides of such sensor. Lugs 75, 76 focus, for example, collected north signal (e.g., lug 75) and the collected south signal (e.g., lug 76) towards speed sensor 60, which may be disposed between lugs 75, 76 in a space 100 defined by lugs 75, 76.

Figure 4:
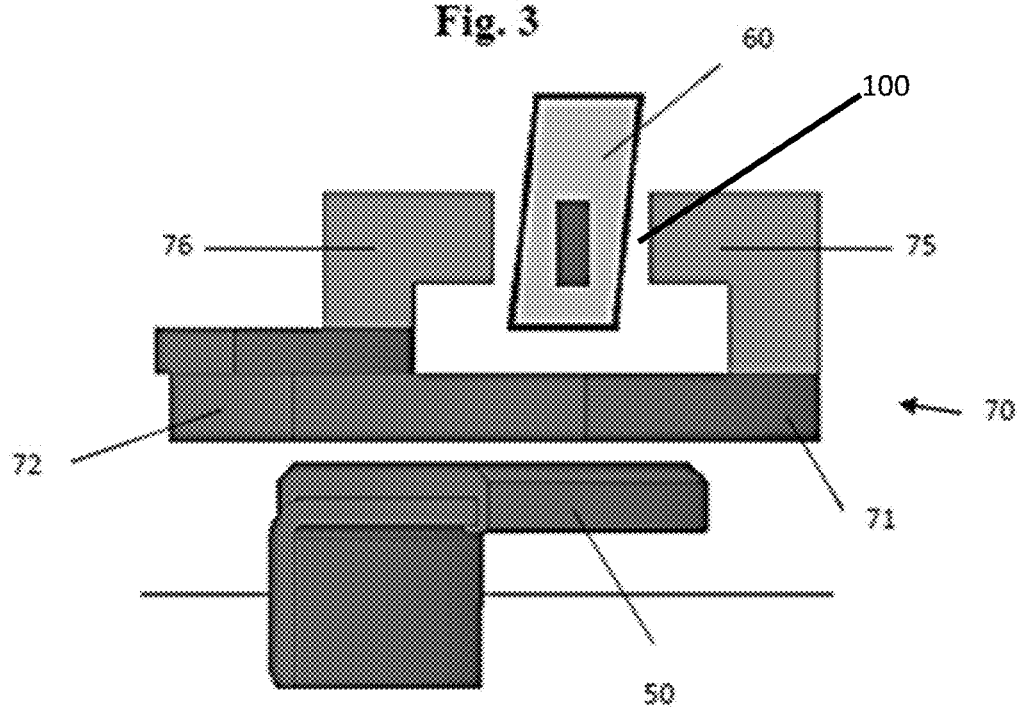
FIG. 4 is an exemplary schematic representation of an amplification device in accordance with this disclosure.

With reference to FIG. 4, fundamentally, amplification device 70, by means of two ferromagnetic rings 71, 72 and two pluralities of teeth 73, 74, simultaneously "captures" the magnetic fields generated by several pole pairs of encoder 50 and concentrates them by means of two lugs 75, 76 in a vicinity of a sensor, e.g., 60. Thus, amplification device 70 may, in exemplary some embodiments, comprise passive components which act as a magnetic flux collector and concentrator. An amplification device, e.g., 70, may be applied to all bearing units for wheel hub assemblies.

With reference again to FIG. 3, exemplary ferromagnetic rings of the device 71, 72 of amplification device 70 must not extend over the 360 degrees of an encoder. In principle, in order to obtain an amplification of a magnetic signal it could be sufficient to have an angular dimension of the ferromagnetic rings 71, 72 such that there is a correspondence between at least one pair of teeth 73 of a radially outer ferromagnetic ring 71 and a pole pair of the encoder 50 (for example the north poles) and between at least one pair of teeth 74 of radially inner ferromagnetic ring 72 and a pole pair of the encoder 50 (for example the south poles). The findings of tests show that with an angular dimension of ferromagnetic rings 71, 72 of not less than 60° it is possible to obtain remarkable amplification of the magnetic signal.

Lugs 75, 76 may have a width B in a circumferential direction which is greater than a same width of a sensor in the circumferential direction. Preferably, dimension B will be in a range of between 1.5 and 2 times a thickness S of each tooth of two pluralities of teeth 73, 74, again measured in a circumferential direction. In other words:

$$(1.5 \times S) \leq B \leq (2 \times S).$$

Figure 5:
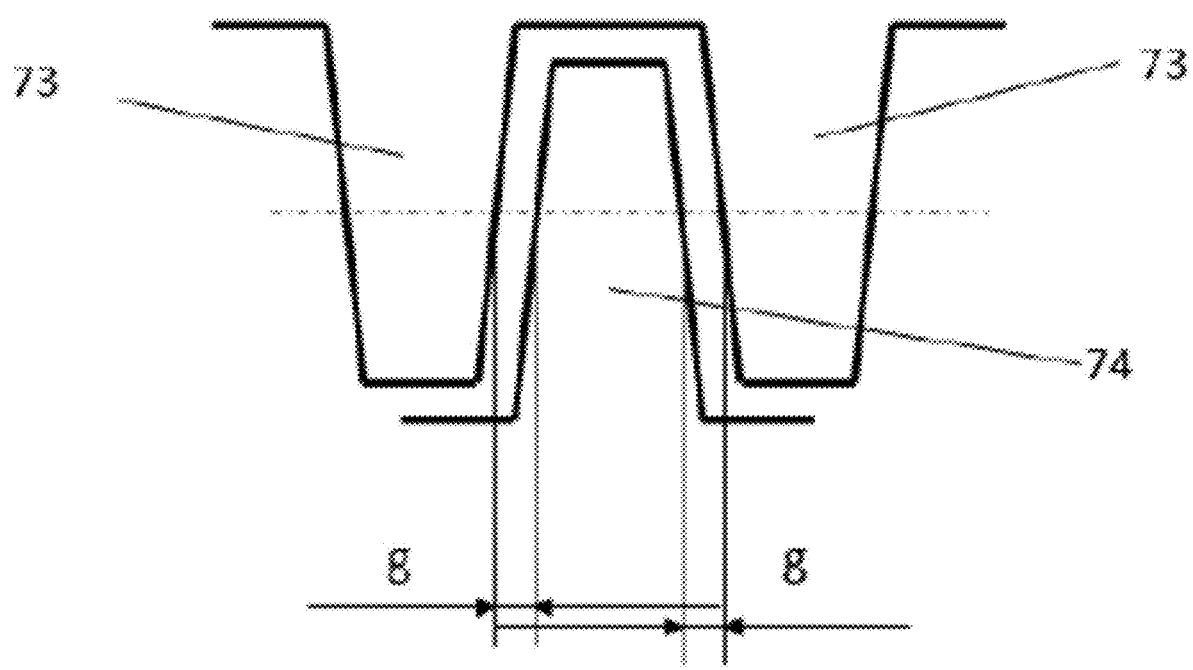
FIG. 5 is an exemplary schematic representation of aspects of an amplification device in accordance with this disclosure.

Finally, with reference to FIG. 5, a gap g, measured along an average circumference of an encoder, between each tooth of first plurality of teeth 73 and each tooth of second plurality of teeth 74 may preferably be approximately constant, allowing for slight variation within acceptable tolerances. In any case, a variation in the value g of the gap within the range of ±50% with respect to a nominal value is acceptable. In other words:

$$g = k \pm 50\%$$

where k is a nominal value of the gap g. A value of less than about −50% of k would negatively affect the efficiency of the device since the teeth would be too close together and the magnetic flux, instead of being concentrated on the lugs 75, 76, could form a closed loop via the two adjacent teeth arranged close together. Similarly a value of the gap greater than about +50% of k would reduce too much the thickness of the teeth, making it technologically difficult to manufacture the single teeth.

Advantages obtained by means of an amplification device according to the present disclosure, e.g., 70, improving resolution of an encoder and increased signal reading distance. By concentrating a field generated by several pole pairs of an encoder, an amplification device, e.g., 70, may reinforce the strength of the signal, allowing greater reading distances and/or an increased resolution. Moreover, by collecting the magnetic signal from several pole pairs of the encoder, signal output by an amplification device, e.g., 70, is improved both in terms of deviation of total pitch and in terms of deviation of single pitch; both parameters being important in terms of quality of magnetic signal.

An object of the present invention is to provide a wheel hub assembly for motor vehicles, provided with encoder and associated sensor, which are made using the existing technology and have an improved resolution and signal reading distance (i.e. a greater distance between encoder and sensor). In this way, according to the present invention, it is possible to increase the competitiveness of the wheel hub assemblies in terms of encoder resolution and signal reading distance, thus satisfying the most pressing needs of motor vehicle manufacturers.

An amplification device in accordance with this disclosure may be a stationary component which faces an encoder and which achieves its object of increasing the magnetic field owing to two concentrator ferromagnetic rings which are separate from each other and which collect magnetic flux generated by pairs of poles of an encoder. Two metal rings are provided with a plurality of teeth, each with same nominal dimensions as a single pole of an encoder and, respectively, one ring collects a magnetic field generated by north poles of an encoder and the other ring collects a signal generated by south poles of an encoder. Each ring is also provided with a projection facing a sensor which respectively focuses a collected north signal and a collected south signal towards a magnetic speed sensor.

By concentrating magnetic fields generated by several pairs of poles of an encoder, an amplification device may reinforce a strength of such a signal, allowing greater reading distances and/or a greater resolution, without increasing a number of pole pairs of an encoder and without varying a size of an encoder itself.

In addition to the embodiments described herein, it is to be understood that numerous further variants are possible. It must also be understood that said embodiments are only examples and do not limit the subject of the invention, nor its applications, nor its possible configurations. On the contrary, although the description provided above enables the person skilled in the art to implement the present invention in at least in one of its examples of configuration, it must be understood that numerous variations of the components described are conceivable, without thereby departing from the scope of the invention, as defined in the accompanying claims, interpreted literally and/or in accordance with their legal equivalents.

An exemplary amplification device for amplifying a magnetic signal generated by an encoder and sensed by a magnetic sensor comprises a radially outer ferromagnetic ring facing an encoder, the radially outer ferromagnetic ring having a first lug; and a radially inner ferromagnetic ring facing the encoder, the radially inner ferromagnetic ring provided with a second lug, wherein the first lug and the second lug are arranged opposite each other and configured to receive a magnetic sensor in a space (e.g., 100) radially between the first lug and the second lug.

In the following exemplary embodiments, each interrelated with exemplary amplification devices disclosed herein, a wheel hub assembly (e.g., 10) for motor vehicles, includes a hub (e.g., 20) and a bearing unit (e.g., 30) in turn comprising: a radially outer ring (e.g., 31), at least one radially inner ring (e.g., 20, 34), at least one row of rolling bodies (e.g., 32, 33) between the radially outer ring (e.g., 31) and the radially inner ring (e.g., 34), a device for detecting a vehicle parameter, having an encoder (e.g., 50) provided with a plurality of pole pairs and firmly fixed to a rotating component of the wheel hub assembly (e.g., 10), and a magnetic sensor (e.g., 60), firmly fixed to a stationary component of the wheel hub assembly (e.g., 10), the wheel hub assembly (e.g., 10) being characterized in that an amplification device (e.g., 70) for amplifying the magnetic signal is arranged between the encoder (e.g., 50) and the magnetic sensor (e.g., 60), said amplification device (e.g., 70) being stationary and comprising a radially outer ferromagnetic ring (e.g., 71) facing the encoder (e.g., 50) and provided with a first lug (e.g., 75) and a radially inner ferromagnetic ring (e.g., 72) facing the encoder (e.g., 50) and provided with a second lug (e.g., 76), said first lug (e.g., 75) and second lug (e.g., 76) being arranged facing the magnetic sensor (e.g., 60) on opposite sides, the amplification device (e.g., 70) being configured to collect the magnetic flux generated by the plurality of pole pairs of the encoder (e.g., 50) via the ferromagnetic rings (e.g., 71, 72) and to concentrate the magnetic flux towards the magnetic sensor (e.g., 60) by means of the first lug (e.g., 75) and the second lug (e.g., 76).

In an exemplary interrelated embodiment of a wheel hub assembly (10), the radially outer ferromagnetic ring (e.g., 71) comprises a first plurality of teeth (e.g., 73) and the radially inner ferromagnetic ring (e.g., 72) comprises a second plurality of teeth (e.g., 74), said first and second pluralities of teeth (e.g., 73, 74) being made so that there is a tangential alternation between a tooth of the first plurality of teeth (e.g., 73) and a tooth of the second plurality of teeth (e.g., 74) and so that each tooth of the two pluralities of teeth (e.g., 73, 74) faces a pole of a pole pair of the encoder (e.g., 50).

In an exemplary interrelated embodiment of a wheel hub assembly (10), the radially outer ferromagnetic ring (e.g., 71) and the radially inner ferromagnetic ring (e.g., 72) are co-moulded inside a polymeric matrix (e.g., 80) inserted into the radially outer ring (e.g., 31) of the bearing unit (e.g., 30).

In an exemplary interrelated embodiment of a wheel hub assembly (10), the radially outer ferromagnetic ring (e.g., 71) and the radially inner ferromagnetic ring (e.g., 72) have an angular dimension not smaller than 60°.

In an exemplary interrelated embodiment of a wheel hub assembly (10), the radially outer ferromagnetic ring (e.g., 71) and the radially inner ferromagnetic ring (e.g., 72) have an angular dimension exactly equal to 360°.

In an exemplary interrelated embodiment of a wheel hub assembly (10), the first lug (e.g., 75) and the second lug (e.g., 76) have a width (B) in a circumferential direction included in the range: $(1.5 \times S) \leq B \leq (2 \times S)$, where (S) is the thickness of each tooth of the two pluralities of teeth (e.g., 73, 74), measured in the circumferential direction.

In an exemplary interrelated embodiment of a wheel hub assembly (10), the gap (g) between each tooth of the first plurality of teeth (e.g., 73) and each tooth of the second plurality of teeth (e.g., 74) is equal to: g=k±50%, where k is the nominal value of the gap (g).

In an exemplary interrelated embodiment of a wheel hub assembly (10), the encoder (e.g., 50) is firmly fixed to the radially inner ring (e.g., 34) of the bearing unit (e.g., 30).

In an exemplary interrelated embodiment of a wheel hub assembly (10), the magnetic sensor (e.g., 60) is a Hall effect sensor or a variable-reluctance sensor.

Each of the various preferred embodiments described in this disclosure is useful in the context of motor vehicles, and particularly useful in connection with motor vehicles having antilock braking systems (e.g., ABS). Upon reading this disclosure, one will appreciate that the various amplification devices described herein may be useful in many other contexts in which a wheel hub assembly is employed.

Further preferred and/or particularly advantageous embodiments of the invention are described in accordance with the characteristic features indicated in the attached dependent claims.

The invention claimed is:

1. An amplification device for amplifying a magnetic signal of an encoder, comprising:
   a radially outer ferromagnetic ring, the radially outer ferromagnetic ring having a first lug; and
   a radially inner ferromagnetic ring, the radially inner ferromagnetic ring provided with a second lug, wherein the first lug and the second lug are arranged opposite each other and configured to receive a magnetic sensor in a space defined by the first lug and the second lug, wherein the outer ferromagnetic ring and the inner ferromagnetic ring are not in contact and separated by an approximately constant width gap.

2. A wheel hub assembly for motor vehicles, comprising:
   a hub;
   a bearing unit comprising:
      a radially outer ring,
      at least one radially inner ring,
      at least one row of rolling bodies between the radially outer ring and the radially inner ring; and
   a detector, for detecting a vehicle parameter, comprising:
      an encoder provided with a plurality of pole pairs and fixed to a rotating component of the wheel hub assembly, and
      a magnetic sensor, fixed to a stationary component of the wheel hub assembly and disposed within the space of the amplification device of claim 1, and
      the amplification device disposed between the encoder and the magnetic sensor and configured to collect magnetic flux generated by the plurality of pole pairs of the encoder via the first ferromagnetic ring and the second ferromagnetic ring, the amplification device further configured to concentrate the magnetic flux towards the magnetic sensor via the first lug and the second lug.

3. The wheel hub assembly of claim 2, wherein the radially outer ferromagnetic ring has a first plurality of teeth and the radially inner ferromagnetic ring has a second plurality of teeth, the first plurality of teeth and the second pluralities of teeth configured to form a tangential alternation between a first tooth of the first plurality of teeth and a second tooth of the second plurality of teeth and further configured such that each tooth of the first plurality of teeth and the second plurality of teeth faces a pole of a pole pair of the plurality of pole pairs.

4. The wheel hub assembly of claim 2, wherein the radially outer ferromagnetic ring and the radially inner ferromagnetic ring are co-moulded inside a polymeric matrix inserted into the radially outer ring of the bearing unit.

5. The wheel hub assembly of claim 2, wherein the radially outer ferromagnetic ring and the radially inner ferromagnetic ring have an angular dimension of greater or equal to 60°.

6. The wheel hub assembly of to claim 5, wherein the radially outer ferromagnetic ring and the radially inner ferromagnetic ring have an angular dimension exactly equal to 360°.

7. The wheel hub assembly of claim 2, wherein the first lug and the second lug have a width (B) in a circumferential direction selected from a range:

$$(1.5 \times S) \leq B \leq (2 \times S)$$

where S is the thickness of at least one tooth of either the first plurality of teeth or the second plurality of teeth, wherein S is measured in the circumferential direction.

8. The wheel hub assembly of claim 2, wherein a gap (g) between at least two teeth of either the first plurality of teeth or the second plurality of teeth is equal to:

$$k \pm 50\%$$

wherein k is a nominal value of the gap (g).

9. The wheel hub assembly of claim 2, wherein the encoder is firmly fixed to the radially inner ring.

10. The wheel hub assembly of claim 2, wherein the magnetic sensor is a Hall effect sensor or a variable-reluctance sensor.

11. A wheel hub assembly for motor vehicles, comprising:
    a hub;
    a bearing unit comprising:
       a radially outer ring,
       at least one radially inner ring,
       at least one row of rolling bodies between the radially outer ring and the radially inner ring; and
    a detector, for detecting a vehicle parameter, comprising:
       an encoder provided with a plurality of pole pairs and fixed to a rotating component of the wheel hub assembly, and
       a magnetic sensor, fixed to a stationary component of the wheel hub assembly;
    an amplification device disposed between the encoder and the magnetic sensor, the amplification device comprising:
       a radially outer ferromagnetic ring facing the encoder, the radially outer ferromagnetic ring having a first lug; and
       a radially inner ferromagnetic ring facing the encoder, the radially inner ferromagnetic ring provided with a second lug, wherein the first lug and the second lug are arranged opposite each other and configured to receive the magnetic sensor in a space radially between the first lug and the second lug.

12. The wheel hub assembly of claim 11, wherein the radially outer ferromagnetic ring has a first plurality of teeth and the radially inner ferromagnetic ring has a second plurality of teeth, the first plurality of teeth and the second pluralities of teeth configured to form a tangential alternation between a first tooth of the first plurality of teeth and a second tooth of the second plurality of teeth and further configured such that each tooth of the first plurality of teeth and the second plurality of teeth faces a pole of a pole pair of the plurality of pole pairs.

13. The wheel hub assembly of claim 12, wherein the radially outer ferromagnetic ring and the radially inner ferromagnetic ring are co-moulded inside a polymeric matrix inserted into the radially outer ring of the bearing unit.

14. The wheel hub assembly of claim 12, wherein the radially outer ferromagnetic ring and the radially inner ferromagnetic ring have an angular dimension of greater or equal to 60°.

15. The wheel hub assembly of to claim 14, wherein the radially outer ferromagnetic ring and the radially inner ferromagnetic ring have an angular dimension exactly equal to 360°.

16. The wheel hub assembly of claim 12, wherein the first lug and the second lug have a width (B) in a circumferential direction selected from a range:

$$(1.5 \times S) \leq B \leq (2 \times S)$$

where S is the thickness of at least one tooth of either the first plurality of teeth or the second plurality of teeth, wherein S is measured in the circumferential direction.

17. The wheel hub assembly of claim 12, wherein a gap (g) between at least two teeth of either the first plurality of teeth or the second plurality of teeth is equal to:

$$k \pm 50\%$$

wherein k is a nominal value of the gap (g).

18. The wheel hub assembly of claim 12, wherein the encoder is fixed to the radially inner ring.

19. The wheel hub assembly of claim 12, wherein the magnetic sensor is a Hall effect sensor or a variable-reluctance sensor.

20. A wheel hub assembly for motor vehicles, comprising:
a hub;
a bearing unit comprising:
   a radially outer ring,
   at least one radially inner ring,
   at least one row of rolling bodies between the radially outer ring and the radially inner ring; and
a detector, for detecting a vehicle parameter, comprising:
   an encoder provided with a plurality of pole pairs and fixed to a rotating component of the wheel hub assembly, and
   a magnetic sensor, fixed to a stationary component of the wheel hub assembly;
an amplification device disposed between the encoder and the magnetic sensor, the amplification device comprising:
   a radially outer ferromagnetic ring facing the encoder, the radially outer ferromagnetic ring having a first lug; and
a radially inner ferromagnetic ring facing the encoder, the radially inner ferromagnetic ring provided with a second lug, wherein the first lug and the second lug are arranged opposite each other and configured to receive the magnetic sensor in a space radially between the first lug and the second lug, wherein the first lug and the second lug have a width (B) in a circumferential direction selected from a range:

$$(1.5 \times S) \leq B \leq (2 \times S)$$

where S is the thickness of at least one tooth of either the first plurality of teeth or the second plurality of teeth, wherein S is measured in the circumferential direction, further wherein a gap (g) between at least two teeth of either the first plurality of teeth or the second plurality of teeth is equal to:

$$k \pm 50\%$$

wherein k is a nominal value of the gap (g).

21. The wheel hub assembly of claim 20, wherein the encoder is firmly fixed to the radially inner ring, and wherein the magnetic sensor is a Hall effect sensor or a variable-reluctance sensor.

\* \* \* \* \*